United States Patent [19]

Krause et al.

[11] Patent Number: 5,295,203
[45] Date of Patent: Mar. 15, 1994

[54] METHOD AND APPARATUS FOR VECTOR CODING OF VIDEO TRANSFORM COEFFICIENTS

[75] Inventors: Edward A. Krause, San Diego; Adam Tom, La Jolla; Vincent Liu, San Gabriel, all of Calif.

[73] Assignee: General Instrument Corporation, Hatboro, Pa.

[21] Appl. No.: 858,102

[22] Filed: Mar. 26, 1992

[51] Int. Cl.⁵ .............................................. G06K 9/36
[52] U.S. Cl. ...................................... 382/56; 358/433; 382/43
[58] Field of Search ................. 382/56, 41, 27, 43, 382/21; 358/133, 433, 432; 364/826, 725; H04N 7/12

[56] References Cited

U.S. PATENT DOCUMENTS

| | | | |
|---|---|---|---|
| 4,910,608 | 3/1990 | Whiteman et al. | 382/56 |
| 5,020,121 | 5/1991 | Rosenberg | 382/56 |
| 5,113,256 | 5/1992 | Citta et al. | 382/56 |
| 5,115,479 | 5/1992 | Murayama | 382/56 |
| 5,148,271 | 9/1992 | Kato et al. | 382/56 |

*Primary Examiner*—Joseph Mancuso
*Attorney, Agent, or Firm*—Barry R. Lipsitz

[57] ABSTRACT

A vector coding scheme for video transform coefficients is provided. A vector is generated to identify a group of coefficients from a block of transform coefficients that qualify for transmission according to predetermined criteria. In an illustrated embodiment, only coefficients having nonzero amplitudes are transmitted. The vector is encoded to provide a vector code word for transmission. The coefficients from the group qualifying for transmission are encoded to provide coefficient code words for transmission. The vector code word correlates the coefficient code words to coefficient locations in the block. In a preferred embodiment, the block is divided into a plurality of regions containing subsets of coefficients. A separate vector is transmitted for each region, correlating the coefficient code words to coefficient locations in the corresponding region of the block.

27 Claims, 6 Drawing Sheets

DECODER

METHOD AND APPARATUS FOR VECTOR CODING OF VIDEO TRANSFORM COEFFICIENTS

BACKGROUND OF THE INVENTION

The present invention relates to the compression of digital video signals, and more particularly to a method and apparatus for processing digitized video signals for transmission in a compressed form.

Television signals are conventionally transmitted in analog form according to various standards adopted by particular countries. For example, the United States has adopted the standards of the National Television System Committee ("NTSC"). Most European countries have adopted either PAL (Phase Alternating Line) or SECAM (Sequential Color And Memory) standards.

Digital transmission of television signals can deliver video and audio services of much higher quality than analog techniques. Digital transmission schemes are particularly advantageous for signals that are broadcast by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided. In a digital television system, a subscriber receives the digital data stream via a receiver/descrambler that provides video, audio, and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data referred to as "pixels." A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green and blue. High definition television requires substantially more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal.

One of the most effective and frequently used classes of algorithms for video compression is referred to as "transform coders." In such systems, blocks of video are linearly and successively transformed into a new domain with properties significantly different from the image intensity domain. The blocks may be nonoverlapping, as in the case of the discrete cosine transform (DCT), or overlapping as in the case of the lapped orthogonal transform (LOT). A system using the DCT is described in Chen and Pratt, "Scene Adaptive Coder," *IEEE Transactions on Communications*, Vol. COM-32, No. 3, March, 1984. A system using the LOT is described in Malvar and Staelin, "The LOT: Transform Coding Without Blocking Effects," *IEEE Transactions on Acoustics, Speech, and Signal Processing*, Vol. 37, No. 3, April, 1989.

Video transforms are used to reduce the correlation that exists among samples of image intensity (pixels). Thus, these transforms concentrate the energy into a relatively small number of transform coefficients. Most common transforms have properties that easily permit the quantization of coefficients based on a model of the human visual system. For example, the DCT produces coefficients with amplitudes that are representative of the energy in a particular band of the frequency spectrum. Therefore, it is possible to utilize the fact that the human viewer is more critical of errors in the low frequency regions of an image than in the high frequency or detailed areas. In general, the high frequency coefficients are always quantized more coarsely than the low frequencies.

The output of the DCT is a matrix of coefficients which represent energy in the two-dimensional frequency domain. Most of the energy is concentrated at the upper left corner of the matrix, which is the low frequency region. If the coefficients are scanned in a zigzag manner, starting in the upper left corner, the resultant sequence will contain long strings of zeros, especially toward the end of the sequence. One of the major objectives of the DCT compression algorithm is to create zeros and to bunch them together for efficient coding.

Coarse quantization of the low frequency coefficients and the reduced number of nonzero coefficients greatly improves the compressibility of an image. Simple statistical coding techniques can then be used to efficiently represent the remaining information. This usually involves the use of variable length code words to convey the amplitude of the coefficients that are retained. The smaller amplitudes which occur the most frequently are assigned short code words. The less probable large amplitudes are assigned long code words. Huffman coding and arithmetic coding are two frequently used methods of statistical coding. Huffman coding is used in the system of Chen and Pratt referred to above. Arithmetic coding is described in Langdon, "An Introduction to Arithmetic Coding," *IBM Journal for Research Development*, Vol. 28, No. 2, March, 1984.

In order to reconstruct a video signal from a stream of transmitted coefficients, it is necessary to know the location or address of each coefficient. Runlength coding is often used for this purpose. One form of runlength coding relies on a two-dimensional variable length coding scheme for sequences of quantized transform coefficients. In a given sequence, the value of a nonzero coefficient (amplitude) is defined as one dimension and the number of zeros preceding the nonzero coefficient (runlength) is defined as another dimension. The combination of amplitude and runlength is defined as an "event." In such a scheme, after a subset of an image frame has been transformed into a block of transform coefficients, only the nonzero coefficients are transmitted. Their addresses can be determined at the receiver by sending runlength codes. A single runlength code denotes the number of preceding zero amplitude coefficients since the last nonzero coefficient in the scan. As noted above, the coefficients within a block are usually serialized using a zigzag scan order. Huffman or arithmetic coding can again be used to represent the runlength codes.

The runlength coding method suffers from various deficiencies. For example, the efficiency of the runlength coding method depends on the order in which the coefficients are scanned. In addition, the statistics of the runlength probability distribution vary depending on the location within the scan. This results in either additional complexity or reduced efficiency when assigning variable length code words to represent the runlength.

It would be advantageous to provide a method and apparatus for encoding video transform coefficient address information that overcomes the problems inherent in the runlength coding method. Such a method and apparatus should be straightforward to implement, and allow the mass production of reliable and cost efficient consumer decoders. The present invention provides a method and apparatus for identifying the locations of transmitted transform coefficients within a block, enjoying the aforementioned advantages.

SUMMARY OF THE INVENTION

In accordance with the present invention, a method is provided for coding video transform coefficients for communication. A block of transform coefficients is provided. A vector is generated to identify a group of coefficients from the block that qualify for transmission according to predetermined criteria. The vector is encoded to provide a vector code word for transmission. The coefficients from the group are encoded to provide coefficient code words for transmission. The vector code word correlates the coefficient code words to coefficient locations within said block.

In an illustrated embodiment, the block is divided into a plurality of regions containing subsets of coefficients. The vector identifies a group of coefficients that qualify for transmission in a first one of said regions. Additional vectors are generated to identify groups of coefficients that qualify for transmission in other regions of the block. The additional vectors are encoded as necessary for transmission.

The vectors produced for the various regions of the block can be analyzed in a predetermined order to determine if a set of one or more of the vectors meets an end-of-block criterion. For example, the end-of-block criterion can be met when there are no coefficients qualified for transmission in the set. In this instance, the vector from said block that immediately precedes said set is encoded as an end-of-block vector, and the vector encoding step is terminated without encoding the vectors contained in the set. Thus, once an end-of-block vector is received for a particular block, no further processing of that block is required. The remaining coefficients in the block (e.g., all zeros) are not transmitted.

In analyzing the vectors to determine if one or more meet the end-of-block criterion, the vectors can be tested in a predetermined order. This order progresses from vectors for regions that are least likely to contain coefficients qualified for transmission to vectors for regions that are successively more likely to contain coefficients qualified for transmission.

In the illustrated embodiment, the regions into which the blocks are divided each contain an equal number of coefficients. The first region comprises an area of the block that is likely to contain more coefficients qualified for transmission than any other region. The other regions of the block are successively less likely to contain coefficients qualified for transmission. For example, the coefficients qualified for transmission can be all of the nonzero coefficients in the block. The zero coefficients are not qualified for transmission.

The vectors representative of regions that contain coefficients qualified for transmission are transmitted with the coefficients for said region. The vectors representative of regions that have no coefficients qualified for transmission are not transmitted unless followed by a vector for another region in the block that does contain coefficients qualified for transmission.

In an alternate vector quantizer embodiment, the locations of the coefficients qualifying for transmission are compared to a limited number of vectors contained in a vector library. A vector is chosen from the library to identify the group based on a predetermined matching criteria. The matching criteria can comprise, for example, the match between an actual vector and a vector in the library that produces the lowest error when one is subtracted from the other.

Encoder apparatus is provided for coding video transform coefficients for communication. The encoder apparatus includes means for converting a portion of video data to a block of transform coefficients. Means are also provided for generating a vector to identify a group of coefficients from the block that qualify for transmission according to predetermined criteria. The vector is encoded to provide a vector code word for transmission. The coefficients that qualify for transmission are also encoded to provide coefficient code words for transmission. The vector code word correlates the coefficient code words to coefficient locations in the block.

The encoder apparatus can further comprise memory means for storing a plurality of code words that identify all of the different possible combinations of coefficients qualified for transmission in the block. In such an embodiment, there will be a separate code word for each of the different possible vectors. The vector encoding means select the code word from the memory that identifies the combination of coefficient locations which matches the locations of the group of coefficients identified by the vector.

In another embodiment, the memory means store a plurality of code words that identify a limited number of the different possible combinations of coefficients qualified for transmission in the block. The vector encoding means select the code word that identifies the combination of coefficient locations represented in the memory which best matches the locations of the group of coefficients identified by the vector, in accordance with a best match criterion.

In the illustrated embodiment, the encoder apparatus includes means for dividing the block into a plurality of regions containing subsets of the coefficients. The vector identifies a group of coefficients that qualify for transmission in a first one of the regions. Additional vectors are generated to identify groups of coefficients that qualify for transmission in other regions of the block. The additional vectors are encoded as necessary.

The encoder apparatus can further comprise means for analyzing the vectors produced for the regions to determine if at least one of the vectors meets an end-of-block criterion. If so, an end-of-block signal is generated. The end-of-block criterion can be met, for example, when at least one vector indicates that there are no further coefficients qualified for transmission in the block. In this manner, the transmission of unnecessary (e.g., zero) coefficients can be avoided. In the illustrated embodiment, the analyzing means search for vectors that meet the end-of-block criterion by testing the vectors in a predetermined order progressing from vectors for regions that are least likely to contain coefficients qualified for transmission to vectors for regions that are successively more likely to contain coefficients qualified for transmission.

The regions into which the block is divided can each contain an equal or substantially equal number of coefficients. The first region can comprise an area of the block that is likely to contain more coefficients qualified for transmission than any other region. The other regions of the block are successively less likely to contain coefficients qualified for transmission.

Decoder apparatus in accordance with the present invention comprises means for receiving encoded coefficients representing video data from a block of a video image area. Means are also provided for receiving an encoded vector corresponding to a group of the encoded coefficients. Means are provided for decoding the encoded vector to recover a vector that identifies locations for the coefficients in the block. Means responsive to the vector decode the encoded coefficients from the group to recover the block with the coefficients in substantially proper locations thereof.

The encoded vector can be received by the decoder apparatus in the form of a variable length code word. Memory means provided in the decoder apparatus store a plurality of vectors that identify different possible combinations of coefficient locations in the block. The received vector code word is used to address the memory means to output a vector that best identifies the actual locations of the coefficients in the block. In an alternate embodiment, a state machine is provided instead of the memory means for decoding the encoded vector in response to the received vector code word.

The block of video image area that the received encoded coefficients corresponds to can comprise a plurality of regions containing different groups of the coefficients. In such an embodiment, the decoder apparatus receives and decodes separate encoded vectors for the different groups of coefficients. The coefficient decoding means are responsive to the separate vectors for assembling the different groups of coefficients into substantially proper locations in the block.

The encoded vectors can include overhead data that is detected and processed by the decoder apparatus. For example, means can be provided for detecting a region tag from the overhead data, said tag identifying the region of the block to which a current vector corresponds. The vector decoding means are responsive to the tag for decoding the current vector.

An end-of-block signal can also be detected from the overhead data. Means, operatively associated with the coefficient decoding means and responsive to the end-of-block signal, fill regions of the block that follow the detection of the end-of-block signal with predetermined filler coefficients. Such coefficients can comprise, for example, zeros.

In another embodiment, a received vector can be encoded as an end-of-block vector. Means, operatively associated with the coefficient decoding means and responsive to the detection of an end-of-block vector, fill regions of the block following the region defined by the end-of-block vector with predetermined filler coefficients.

BRIEF DESCRIPTION OF THE DRAWINGS

FIG. 2 is a diagrammatic illustration of a decoder for converting the variable length code words output from the encoder of FIG. 1 back to video data for display on a television set or the like;

DETAILED DESCRIPTION OF THE INVENTION

The present invention provides a new technique designated "vector coding," for use in communicating data via a variable length encoder and variable length decoder. The vector coding technique disclosed herein relates to the addressing of transform coefficients that are selected for transmission. Unlike the prior art run-length coding technique, the vector coding process of the present invention does not depend on the order in which the coefficients are scanned Other advantages of the vector coding technique over prior art techniques will be apparent from the discussion which follows.

Figure 1:
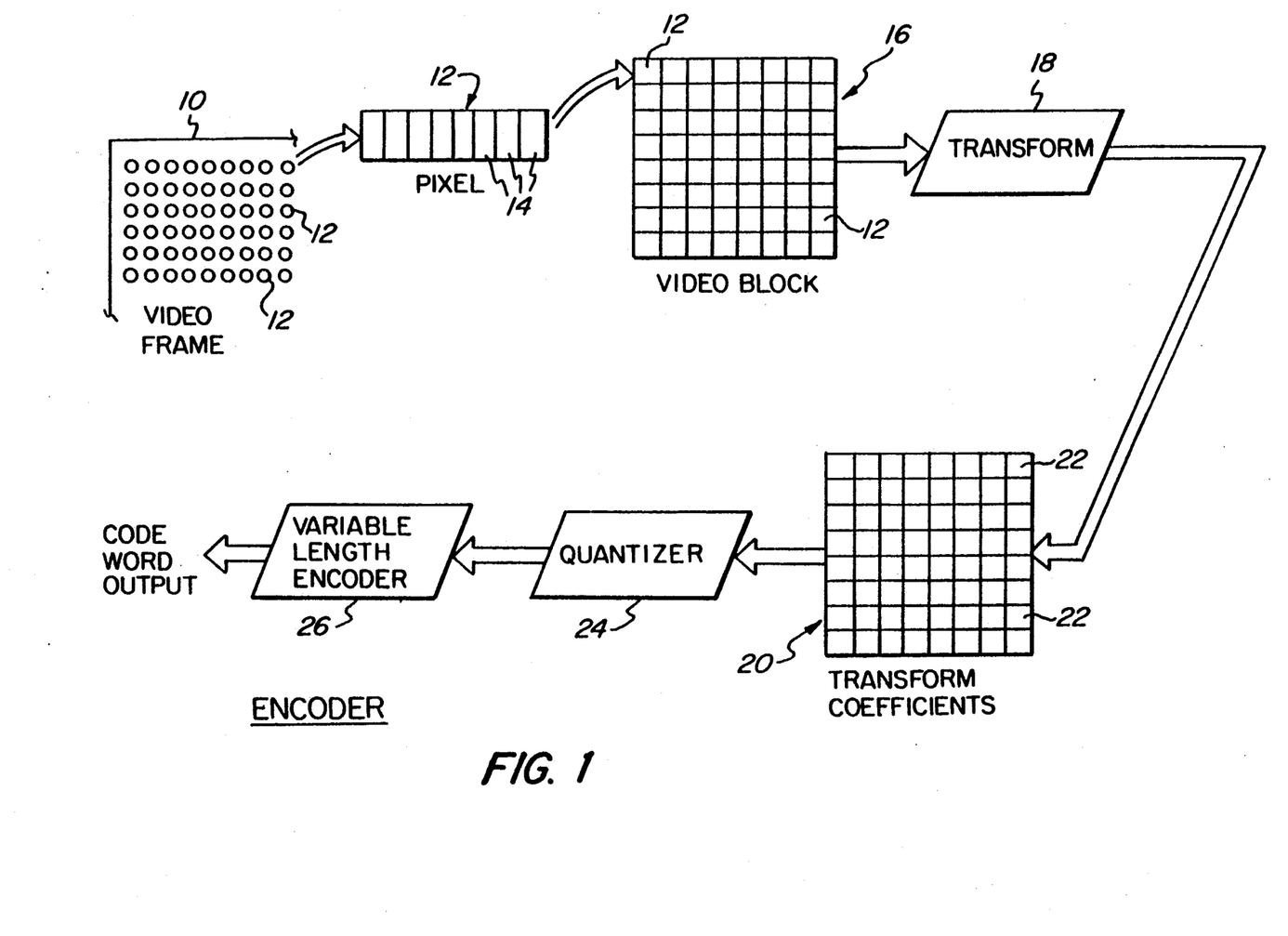
FIG. 1 is a diagrammatic illustration showing the operation of an encoder for transforming video data into variable length code words for transmission.

FIG. 1 illustrates, in diagrammatic form, the operation of an encoder for converting video data into variable length code words for transmission. A video frame 10 comprises a plurality of lines of pixel data. Each pixel 12 is represented by a digital word comprising eight bits 14 that define video luminance or chrominance information. A conventional digital television image will comprise on the order of 640 pixels across the frame for each of 480 horizontal lines that extend from the top of the frame to the bottom of the frame. High definition television provides substantially more pixels per line and lines per frame.

As illustrated in FIG. 1, an encoder for encoding the video information will typically arrange a plurality of pixels into a video block 16. In the illustrated embodiment, the pixels from each video frame are grouped into 8×8 blocks, for a total of 64 pixels per video block. The video blocks that contain the pixel data are each transformed by a conventional transform coder 18 to provide corresponding blocks 20 of transform coefficients 22. Transform coder 18 can implement, for example, either of the well known discrete cosine or lapped orthogonal transforms.

Block 20 of transform coefficients 22 is quantized using known techniques by a quantizer 24, which outputs the quantized coefficients to a variable length encoder 26 that outputs code words representative of the individual transform coefficients. The code words are transmitted to one or more receivers via a communication channel in a conventional manner.

Figure 2:
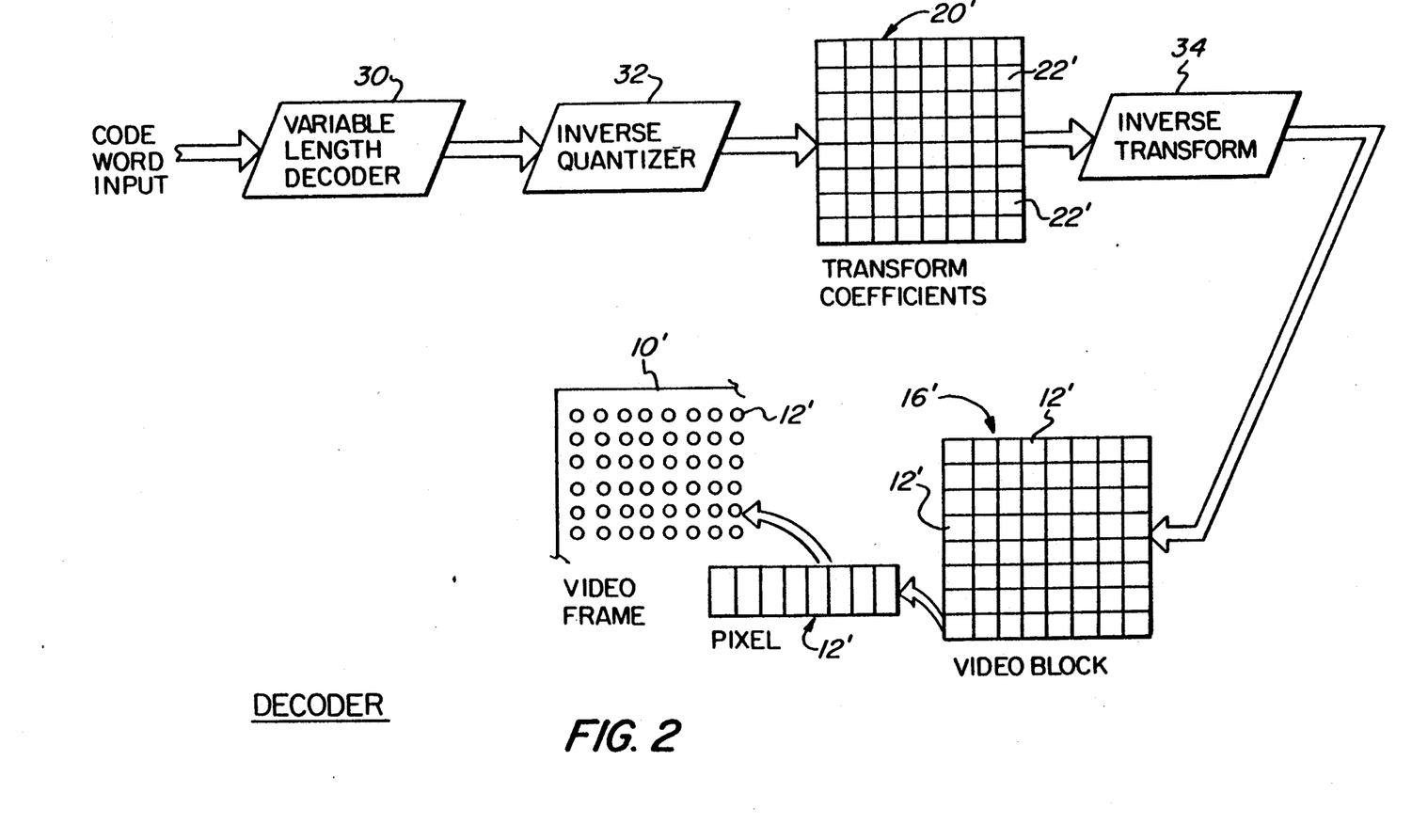

At a receiver, the code words are decoded to recover the original video data, using a decoder as illustrated in FIG. 2. The received code words are input to a variable length decoder 30 to recover quantized transform coefficients. The recovered quantized coefficients are inverse quantized in an inverse quantizer 32. The resultant transform coefficients are reassembled into a block 20', containing individual recovered transform coefficients 22'. The recovered block of transform coefficients is inverse transformed as indicated at 34, to recover a block of video data 16' containing pixels 12'. The pixels are then output to a television receiver or the like, to recreate a video frame 10'.

Figure 3:
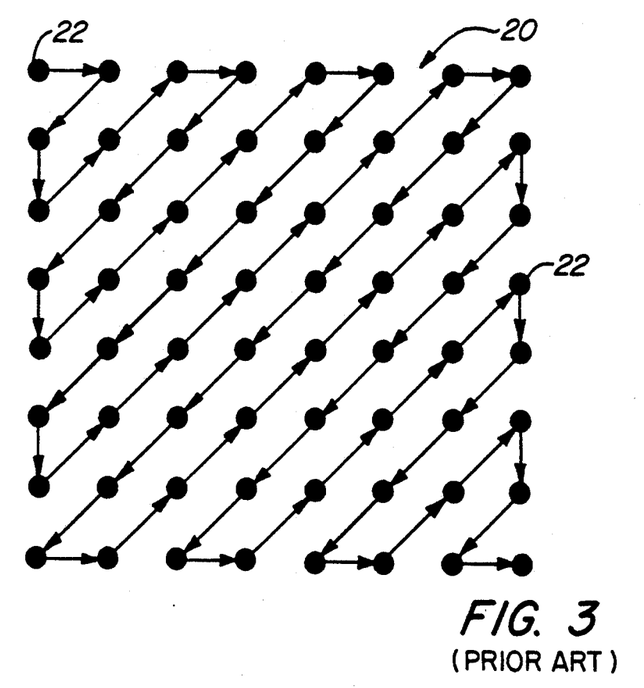
FIG. 3 is a diagram illustrating a zigzag scanning order used in prior art encoders to serialize a block of transform coefficients.

In the prior art, it has been conventional to scan the transform coefficients 22 of block 20 in a zigzag fashion, as shown in FIG. 3, to serialize the coefficient data for transmission. Since there is a high likelihood that the upper left-hand corner of the block will contain nonzero coefficients, and that any zero coefficients will be found toward the lower right corner of the block, such a zigzag scanning arrangement results in a higher probability that long runlengths of zero will be obtained. With runlength coding, this result generally enables a higher compression to be achieved.

In the vector coding scheme of the present invention, no particular scanning pattern is required to maintain a high compression efficiency. In accordance with the present invention, a unique code word is used to specify a subset of coefficients that is selected for transmission within a block of transform coefficients, or within portions of the block referred to as "regions." In a preferred embodiment, all possible combinations of coefficients that could be selected for transmission from a block or region are accounted for and a unique code word is provided to describe each combination. Efficiency is achieved by assigning variable length codes, such as Huffman or arithmetic codes, to each different group of coefficients that could be selected in a block or region. The most probable coefficient selections are assigned the shortest code words. Conversely, the combinations of coefficients that are least likely to be selected are assigned the longest code words. These code words completely specify the group of coefficients selected for transmission from each block or region, and are transmitted to a receiver to enable received coefficients to be properly located in successive blocks of transform coefficients. When the properly located transform coefficients are inverse transformed, the pixel data within the resultant video blocks will be arranged in the right order for reproduction on a video display.

In the embodiment illustrated herein, only coefficients with amplitudes greater than zero after quantization are transmitted. The amplitude codes for these coefficients are transmitted in any predetermined scan order. Unlike runlength coding, the scan order in which the amplitude codes are transmitted does not effect the compression efficiency.

Figure 4:
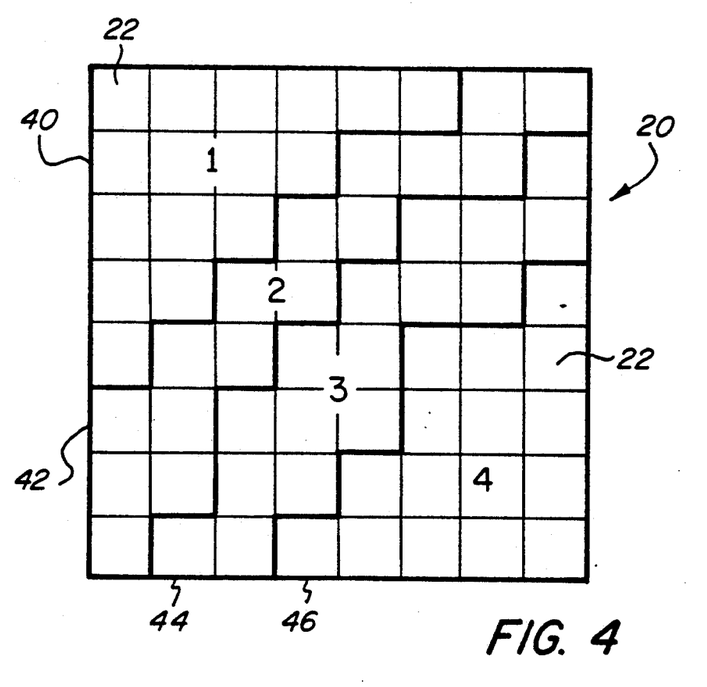
FIG. 4 is a diagram illustrating the division of a block of transform coefficients into regions in accordance with the present invention.

The number of possible coefficient combinations (i.e., locations in a block of transform coefficients having zero and nonzero entries) increases very rapidly as a function of the number of coefficients in the block or region. For example, the most popular transforms produce blocks of 8×8 coefficients. In this case, there are $2^{64}$ possible combinations of coefficients which are nonzero. Since it is not easy to implement a system capable of encoding or decoding this many code words, it is desirable to reduce the size of the region that is vector coded. For example, a block of 8×8 DCT or LOT coefficients can be subdivided into four regions as shown in FIG. 4. Each region 40, 42, 44, 46 contains 16 transform coefficients 22. The DCT and the LOT both have the characteristic of producing coefficients representative of the amount of energy in different frequency bands. In FIG. 4, the horizontal frequency increases from left to right. Vertical frequency increases from top to bottom. The top left coefficient represents the DC or average energy in the entire block. The bottom right coefficient corresponds to the energy that is visible in the form of diagonal lines having the maximum frequency possible given the horizontal and vertical pixel sampling rate.

For most imagery, the energy is concentrated into the low frequency coefficients. These are the coefficients closest to the top left corner of the block illustrated in FIG. 4. The first region 40, which will be represented by a first vector, was chosen in order to maximize the number of coefficients that are likely to be greater than zero. The second region 42, third region 44, and fourth regions 46 will be represented by separate vectors. These regions were chosen using the same selection criterion (i.e., maximizing the number of nonzero coefficients) but applied to the remaining coefficients only. It should be appreciated that the region boundaries illustrated in FIG. 4 are exemplary only, and that different areas can be chosen for the regions. Also, there may be more or fewer than the four regions illustrated.

Figure 5:
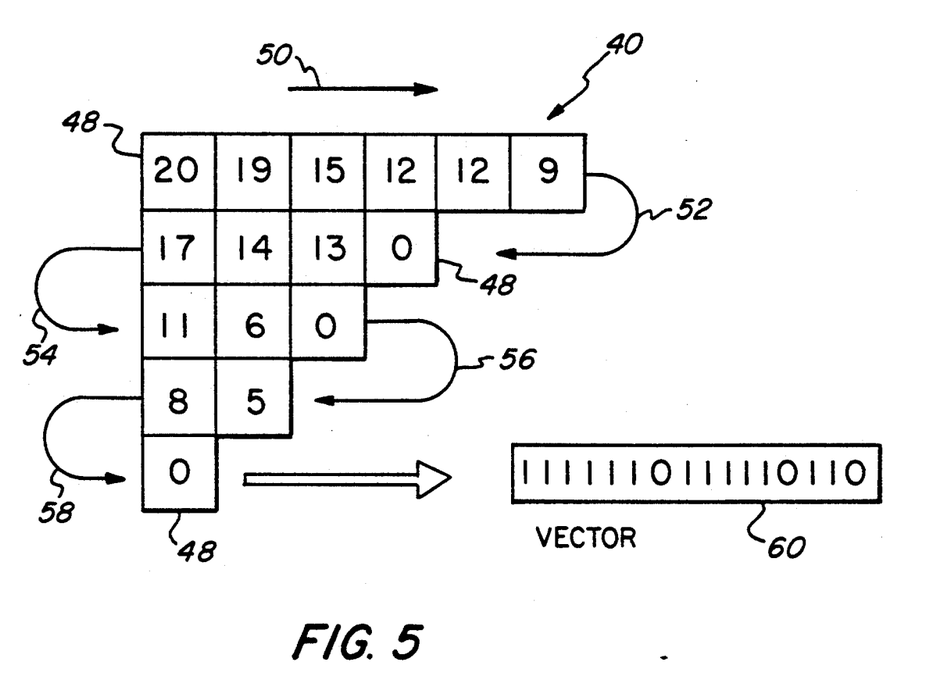
FIG. 5 is an illustration showing how a first region of FIG. 4 might be scanned in order to provide a vector in accordance with the present invention.

FIG. 5 illustrates an example of how a vector can be formed by scanning the coefficients included in first region 40 of the block of transform coefficients. The numbers within the boxes 48 represent the actual amplitudes of the sixteen coefficients residing in the region. In the example illustrated, the top row of the coefficients is scanned from left to right as indicated by arrow 50. The second row is scanned from right to left as indicated by arrow 52. The third row is scanned from left to right as indicated by arrow 54, and the fourth row is scanned from right to left as indicated by arrow 56. Finally, the bottom coefficient in the region is scanned as illustrated by arrow 58. A vector is formed on the basis of the scanning to indicate whether each of the sixteen coefficients has an amplitude of zero or greater than zero. If the amplitude is greater than zero, the coefficient will be transmitted, and a logic one will be entered into the vector for that coefficient. If a coefficient has an amplitude of zero, it will not be transmitted and the vector will include a logic zero representative of the coefficient. Thus, vector 60 contains a sixteen bit word "1111110111110110" that designates which of the coefficients from the region are qualified for transmission, according to the order in which the coefficients of the region have been scanned. A receiver that receives vector 60 will know that there is no new coefficient in a received data stream for any of the "zero" entries in the vector. Instead of decoding a received code word for each of the "zero" entries, the receiver will merely insert a zero into the appropriate coefficient location within the region currently being received. It should be appreciated that any other scanning order can be used to form the vectors, as the efficiency of the vector coding method does not depend on any particular scanning order.

Figure 6:
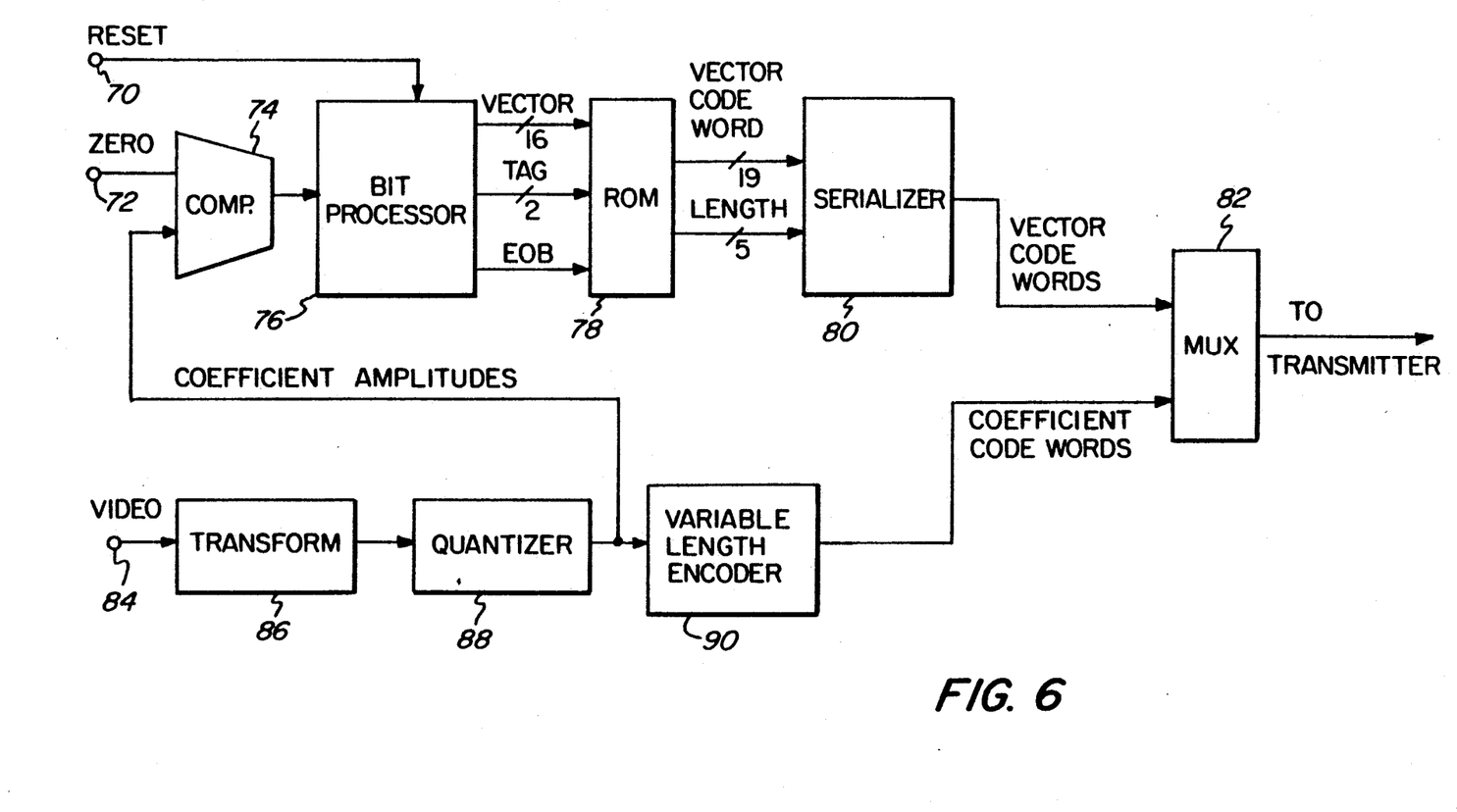
FIG. 6 is a block diagram illustrating encoder apparatus in accordance with the present invention.

FIG. 6 illustrates, in block diagram form, an encoder that can be used to implement the vector coding scheme of the present invention. Blocks of video pixel data are input via terminal 84 to a transform coder 86 that can implement, for example, the DCT. The resultant coefficient amplitudes are input to a quantizer 88 and variable length encoder 90 in a conventional manner to provide coefficient code words for transmission. The quantized coefficient amplitudes are also input, in accordance with the present invention, to a comparator 74 that compares each of the coefficient amplitudes to a zero amplitude input at terminal 72. The comparator outputs a logic one if the coefficient is not equal to zero and a logic zero otherwise. A bit processor 76 receives the decision bits from the comparator and produces three outputs. The first output is the vector obtained by repackaging the decision bits into sixteen bit words, such as vector 60 illustrated in FIG. 5. Each bit of this word corresponds to one of the sixteen coefficients in one of the four vector partitions 40, 42, 44, 46 illustrated in FIG. 4. Two "tag" bits are provided to indicate which of the four vector partitions ("regions") is currently being encoded.

An additional end-of-block (EOB) bit is output by bit processor 76 in order to further improve coding efficiency. The EOB bit indicates whether there are any remaining nonzero coefficients in the vectors which follow. For example, if the first vector (the vector from region 40) is being encoded, then the EOB bit will be set high if there are no remaining nonzero coefficients in the second, third or fourth vectors from regions 42, 44, 46, respectively. If the second vector is being encoded, then the EOB bit will be set high if there are no remaining nonzero coefficients in the third or fourth vectors. In the case of the third vector, the EOB bit indicates whether there are additional nonzero coefficients in the fourth vector. The EOB bit serves no purpose when encoding the last of the four vectors. The significance of applying the EOB bit as an input to the ROM is that it allows the assignment of one of two different code words to represent the same vectors. The first code word is selected if the EOB bit is a logic zero, and indicates not only addressing information for the current region but also that there are additional nonzero coefficients to follow. The second code word is used if the EOB bit is a logic one and indicates that all remaining coefficients in the block are zero, and therefore the encoding process can be terminated early.

Bit processor 76 is reset at the beginning of each block. A reset signal for this purpose is input to the bit processor via terminal 70. All of the functions of the bit processor can be easily implemented in a single programmable logic device.

A read-only memory (ROM) 78 is used to map the sixteen bit coefficient word, the two bit region tag, and the EOB bit from bit processor 76 into a unique variable length code word. The length of the code word is also output by the ROM in order to concatenate the code words into a serial stream for transmission. The maximum code word length in the implementation illustrated in FIG. 6 is nineteen bits. The vector code word and length from ROM 78 are serialized in a conventional serializer circuit 80 for output to a multiplexer 82. At this point, the vector code words are multiplexed with the coefficient code words from variable length encoder 90, to provide a digital data stream for transmission.

Figure 7:
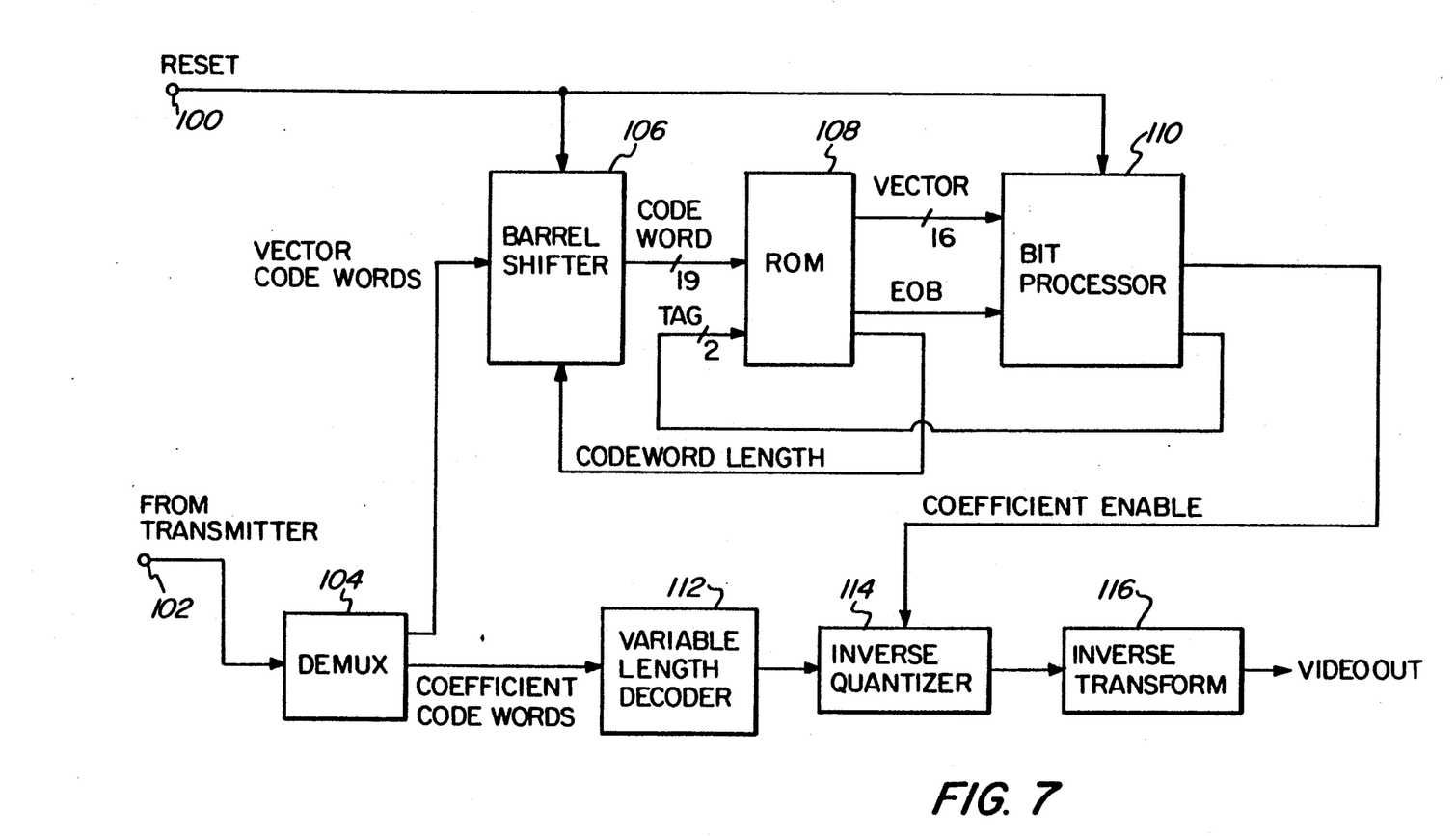
FIG. 7 is a block diagram illustrating decoder apparatus in accordance with the present invention.

An implementation of a vector decoder in accordance with the present invention is illustrated in FIG. 7. The digital data stream received from the encoder is input to a demultiplexer 104 via terminal 102. The demultiplexer separates the vector code words from the coefficient code words. The coefficient code words are input to a variable length decoder 112, that can comprise a ROM which outputs the quantized coefficients represented by the code words. These code words are inverse quantized in section 114, which assembles the transform coefficients back into their block form. The inverse quantizer is responsive to a coefficient enable signal derived from the vector, which indicates the positions of all zero amplitude coefficients in the original block of transform coefficients. The recovered block of transform coefficients is inverse transformed in section 116, for output of the recovered blocks of video pixel data.

The vector code words output from the demultiplexer 104 are input to barrel shifter 106, either in a serial or parallel format. The barrel shifter outputs nineteen bits, corresponding to the maximum code word length, which are then used to address a ROM 108. The ROM is addressed by two additional region tag bits output from a bit processor 110. These bits indicate which region of a block of transform coefficients is currently being processed (i.e., which of the four vectors is being decoded). Those skilled in the art will appreciate that the maximum code word length can be limited to less than nineteen bits, if necessary to accommodate a ROM with an address size of fewer than twenty-one total bits, with little effect on compression efficiency. Alternatively, a plurality of ROMs can be combined or higher density static or dynamic RAM could be used to provide a larger memory capacity. In an alternate embodiment, a state machine can be substituted for ROM 108 to generate the vector, EOB and code word length data from the received code words. The use of a state machine is advantageous because it can be implemented at a relatively low cost, which is desirable for consumer decoders.

ROM 108 has three outputs. The first is the decoded vector indicating which of the sixteen coefficients have been transmitted for the region currently being decoded. The second is the EOB bit telling the bit processor 110 to either continue or discontinue receiving the remaining vectors of the block. The third ROM output is the actual length of the decoded code word. This is used by the barrel shifter to synchronize with the beginning of the next code word. The bit processor converts the parallel input ROM data to a serial stream of sixty-four bits which are output in the desired block scan order. These "coefficient enable" bits are input to inverse quantizer 114 to identify the coefficients that were selected at the encoder for transmission. The bit processor also identifies the vector that is currently being decoded via the two bit region tag. Both the bit processor and the barrel shifter are reset at the beginning of each block, via a reset signal input to terminal 100. As with the encoder, the decoder bit processor can be easily implemented in a single programmable logic device.

In an alternate embodiment, the vector coder of the present invention can be implemented as a vector quantizer. The difference is that the vector quantizer can only transmit a limited number of vector selection patterns. Each time a new vector is observed, it is compared to a list of allowed vectors stored in a vector library, to determine which is the best match. The code word corresponding to the best matching vector is then transmitted to the decoder even if it requires that the amplitude of some coefficients be forced to zero, or if it requires some coefficients with a zero amplitude to be transmitted. The latter case requires that a special zero amplitude code word be reserved when transmitting the coefficient values.

A disadvantage of the vector quantization scheme is that the encoder will require additional complexity to determine the best match between the actual vector for a region, and a vector contained in the vector library. However, the vector quantization scheme has the advantage that the memory requirements are reduced and a slight improvement can be achieved in the efficiency of the vector code words due to the reduced number of possible vectors.

It should now be appreciated that the present invention provides a new and improved technique for coding video transform coefficients. Coefficient code words representative of coefficients qualified for transmission (e.g., nonzero coefficients) are transmitted together with vector code words. The vector code words correlate the coefficient code words to coefficient locations in a block of transform coefficients. In a preferred embodiment, the blocks of transform coefficients are divided into a plurality of regions, that are chosen to maximize the number of coefficients that are likely to be greater than zero for a first vector, with subsequent regions producing vectors that are successively less likely to contain nonzero coefficients. The invention can be implemented as either a vector coder or a vector quantizer.

Although the invention has been described in connection with a specific embodiment thereof, those skilled in the art will appreciate that numerous adaptations and modifications may be made thereto, without departing from the spirit and scope of the invention as set forth in the claims.

What is claimed is:

1. A method for coding video transform coefficients for communication comprising the steps of:
    providing a block of transform coefficients;
    generating a vector to identify locations of a group of coefficients from said block that qualify for transmission according to predetermined criteria;
    encoding said vector to provide a vector code word for transmission; and
    encoding the coefficients from said group to provide coefficient code words for transmission;
    wherein said vector code word correlates the coefficient code words to coefficient locations in said block.

2. A coding method in accordance with claim 1 comprising the further step of:
    dividing said block into a plurality of regions containing subsets of coefficients, said vector identifying a group of coefficients that qualify for transmission in a first one of said regions; and
    generating additional vectors for encoding to identify locations of groups of coefficients that qualify for transmission in other regions of said block.

3. A coding method in accordance with claim 2 comprising the further steps of:
    analyzing the vectors produced for said regions in a predetermined order to determine if a set of said vectors meets an end of block criterion;
    encoding the vector from said block that immediately precedes said set as an end of block vector if said criterion is met for said set; and
    terminating said vector encoding step without encoding the vectors in said set.

4. A coding method in accordance with claim 3 wherein said end of block criterion is met when there are no coefficients qualified for transmission in said set.

5. A coding method in accordance with claim 4 wherein:
    said predetermined order progresses from vectors for regions that are least likely to contain coefficients qualified for transmission to vectors for regions that are successively more likely to contain coefficients qualified for transmission.

6. A coding method in accordance with claim 2 wherein:
    said regions each contain a substantially equal number of coefficients;
    said first region comprises an area of said block that is likely to contain more coefficients qualified for transmission than any other region; and
    the other regions of said block are successively less likely to contain coefficients qualified for transmission.

7. A coding method in accordance with claim 6 wherein:
    the vectors representative of regions that contain coefficients qualified for transmission are transmitted with the coefficients for said region; and
    no vectors are transmitted for regions that have no coefficients qualified for transmission unless followed by a vector for a region that does contain coefficients qualified for transmission.

8. A coding method in accordance with claim 1 wherein said vector generating step comprises the steps of:
    comparing the locations of said group of coefficients qualifying for transmission to locations designated by a limited number of vectors contained in a vector library; and
    choosing a vector from said library to identify said group based on predetermined matching criteria.

9. A coding method in accordance with claim 8 comprising the further step of dividing said block into a plurality of regions containing different subsets of the coefficients contained in the block; wherein:
    said regions each contain a substantially equal number of coefficients;
    a first region comprises an area of said block that is likely to contain more coefficients qualified for transmission than any other region; and
    the other regions of said block are successively less likely to contain coefficients qualified for transmission.

10. A coding method in accordance with claim 9 wherein:
    said vector identifies the locations of a group of coefficients that qualify for transmission in said first region;
    additional vectors are generated to identify the locations of groups of coefficients that qualify for transmission in the other regions of said block;
    vectors representative of regions that contain coefficients qualified for transmission are transmitted with the coefficients for said region; and
    no vectors are transmitted for regions that have no coefficients qualified for transmission unless followed by a vector for a region that does contain coefficients qualified for transmission.

11. Encoder apparatus for coding video transform coefficients for communication comprising:

means for converting a portion of video data to a block of transform coefficients;

means for generating a vector to identify locations of a group of coefficients from said block that qualify for transmission according to predetermined criteria;

means for encoding said vector to provide a vector code word for transmission; and means for encoding the coefficients from said group to provide coefficient code words for transmission;

wherein said vector code word correlates the coefficient code words to coefficient locations in said block.

12. Encoder apparatus in accordance with claim 11 further comprising:

memory means for storing a plurality of code words that identify all of the different possible combinations of coefficients qualified for transmission in said block;

wherein said vector encoding means select the code word from said memory that identifies the combination of coefficients qualified for transmission which matches the locations of the group of coefficients identified by said vector.

13. Encoder apparatus in accordance with claim 11 further comprising:

memory means for storing a plurality of code words that identify a limited number of the different possible combinations of coefficients qualified for transmission in said block;

wherein said vector encoding means select the code word that identifies the combination of coefficients qualified for transmission represented in said memory which best matches the locations of the group of coefficients identified by said vector, in accordance with a best match criterion.

14. Encoder apparatus in accordance with claim 11 further comprising:

means for dividing said block into a plurality of regions containing subsets of said coefficients, said vector identifying locations of a group of coefficients that qualify for transmission in a first one of said regions; and means for generating additional vectors for encoding to identify the locations of groups of coefficients that qualify for transmission in other regions of said block.

15. Encoder apparatus in accordance with claim 14 further comprising:

means for analyzing the vectors produced for said regions to determine if one of said vectors meets an end of block criterion; and means for encoding a vector meeting said end of block criterion to identify it as an end of block vector.

16. Encoder apparatus in accordance with claim 15 wherein said end of block criterion is met when there are no subsequent vectors in said block that identify locations for coefficients which are qualified for transmission.

17. Encoder apparatus in accordance with claim 16 wherein said analyzing means search for vectors that meet the end of block criterion by testing said vectors in a predetermined order that progresses from vectors for regions that are least likely to contain coefficients qualified for transmission to vectors for regions that are successively more likely to contain coefficients qualified for transmission.

18. Encoder apparatus in accordance with claim 14 wherein:

said regions each contain a substantially equal number of coefficients;

said first region comprises an area of said block that is likely to contain more coefficients qualified for transmission than any other region; and the other regions of said block are successively less likely to contain coefficients qualified for transmission.

19. Encoder apparatus in accordance with claim 14 further comprising:

memory means for storing a plurality of code words that identify all of the different possible combinations of coefficients qualified for transmission in said block;

wherein said vector encoding means select the code word from said memory that identifies the combination of coefficients qualified for transmission which matches the locations of the group of coefficients identified by a vector to be encoded.

20. Encoder apparatus in accordance with claim 14 further comprising:

memory means for storing a plurality of code words that identify a limited number of the different possible combinations of coefficients qualified for transmission in said block;

wherein said vector encoding means select the code word that identifies the combination of coefficients qualified for transmission represented in said memory which best matches the locations of the group of coefficients identified by a vector to be encoded, in accordance with a best match criterion.

21. Decoder apparatus for decoding video transform coefficients comprising:

means for receiving encoded coefficients representing video data from a block of a video image area;

means for receiving an encoded vector corresponding to a group of said encoded coefficients;

means for decoding said encoded vector to recover a vector that identifies locations for said coefficients in said block; and means responsive to said vector for decoding the encoded coefficients from said group to recover said block with said coefficients in substantially proper locations thereof.

22. Decoder apparatus in accordance with claim 21 wherein said encoded vector is received as a code word, said apparatus further comprising:

memory means for storing a plurality of vectors that identify different possible combinations of transmitted coefficient locations in said block;

wherein said code word is used to address the memory means to output a vector that best identifies the actual locations of the transmitted coefficients in said block.

23. Decoder apparatus in accordance with claim 21 wherein:

said encoded vector is received as a code word; and said means for decoding said encoded vector comprise a state machine responsive to said code word.

24. Decoder apparatus in accordance with claim 21 wherein:

said block comprises a plurality of regions containing different groups of said coefficients;

separate encoded vectors are received and decoded for the different regions; and said coefficient decoding means are responsive to the separate vectors for assembling the different groups of coefficients into substantially proper locations in said block.

25. Decoder apparatus in accordance with claim 24 wherein said encoded vectors include overhead data, said apparatus further comprising:

means for detecting a region tag from said overhead data, said tag identifying the region of said block to which a current vector corresponds;

wherein said vector decoding means are responsive to said tag for decoding the current vector.

26. Decoder apparatus in accordance with claim 25 further comprising:

means for detecting an end of block signal from said overhead data; and means, operatively associated with said coefficient decoding means and responsive to said end of block signal, for filling subsequent regions of said block with predetermined filler coefficients.

27. Decoder apparatus in accordance with claim 24 further comprising:

means for detecting if one of said received vectors is encoded as an end of block vector; and means, operatively associated with said coefficient decoding means and responsive to said detecting means, for filling regions of said block following the region defined by said end of block vector with predetermined filler coefficients.

* * * * *